(12) United States Patent
Baek et al.

(10) Patent No.: US 12,267,802 B2
(45) Date of Patent: Apr. 1, 2025

(54) POSITIONING METHOD USING SIDELINK, AND DEVICE THEREFOR

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 17/754,818

(22) PCT Filed: Nov. 5, 2020

(86) PCT No.: PCT/KR2020/015377
§ 371 (c)(1),
(2) Date: Apr. 13, 2022

(87) PCT Pub. No.: WO2021/091245
PCT Pub. Date: May 14, 2021

(65) Prior Publication Data
US 2023/0319761 A1 Oct. 5, 2023

(30) Foreign Application Priority Data

Nov. 8, 2019 (KR) .................. 10-2019-0142298
Nov. 8, 2019 (KR) .................. 10-2019-0142312

(51) Int. Cl.
*H04W 64/00* (2009.01)
*H04L 5/00* (2006.01)

(52) U.S. Cl.
CPC .......... *H04W 64/00* (2013.01); *H04L 5/0051* (2013.01)

(58) Field of Classification Search
CPC .... G01S 1/042; G01S 1/0428; G01S 2205/01; G01S 3/14; G01S 5/0215; G01S 5/0284;
(Continued)

(56) References Cited

U.S. PATENT DOCUMENTS 11,695,459 B2 * 7/2023 Khoryaev ............ H04B 7/0695
375/267
2017/0212206 A1 7/2017 Kim et al.
(Continued)

FOREIGN PATENT DOCUMENTS

KR 10-2019-0067362 6/2019
WO 2019-083344 5/2019

OTHER PUBLICATIONS

PCT International Application No. PCT/KR2020/015377, International Search Report dated Feb. 22, 2021, 3 pages.
(Continued)

*Primary Examiner* — Timothy X Pham
(74) *Attorney, Agent, or Firm* — LEE, HONG, DEGERMAN, KANG & WAIMEY

(57) ABSTRACT

The present disclosure relates to a positioning method using a sidelink, and a device. According to one aspect, a method of performing positioning through a sidelink by a vehicle terminal can comprise the steps of: receiving a request positioning reference signal (PRS) from a positioning terminal; determining the positioning terminal-based direction angle on the basis of the request PRS; determining a response PRS ID corresponding to the request PRS ID of a request RRS, on the basis of the determined direction angle; and transmitting a response PRS corresponding to the determined response PRS ID. The vehicle terminal is capable of communicating with at least one of another vehicle terminal, a UE related to an autonomous driving vehicle, the BS or a network.

14 Claims, 20 Drawing Sheets

(58) Field of Classification Search
CPC ...... H04L 5/0048; H04L 5/0051; H04W 4/40; H04W 64/00; H04W 76/14; H04W 92/18
See application file for complete search history.

(56) References Cited

U.S. PATENT DOCUMENTS

| | | | |
|---|---|---|---|
| 2019/0044667 A1 | 2/2019 | Guo et al. | |
| 2019/0230618 A1* | 7/2019 | Saur | H04W 56/001 |
| 2022/0279310 A1* | 9/2022 | Xiao | H04W 4/025 |
| 2022/0321293 A1* | 10/2022 | Ren | H04W 72/20 |

OTHER PUBLICATIONS

LG Electronics, "Discussion on physical layer procedures for NR sidelink," R1-1910783, 3GPP TSG RAN WG1 Meeting #98bis, Oct. 2019, 25 pages.
Huawei et al., "NR positioning measurements," R1-1910035, 3GPP TSG RAN WG1 Meeting #98bis, Oct. 2019, 21 pages.
Korean Intellectual Property Office Application No. 10-2022-7012531, Office Action dated May 29, 2024, 5 pages.

* cited by examiner (a)

(b)

POSITIONING METHOD USING SIDELINK, AND DEVICE THEREFOR

CROSS-REFERENCE TO RELATED APPLICATIONS

This application is the National Stage filing under 35 U.S.C. 371 of International Application No. PCT/KR2020/015377, filed on Nov. 5, 2020, which claims the benefit of earlier filing date and right of priority to Korean Application Nos. 10-2019-0142298, filed on Nov. 8, 2019 and 10-2019-0142312, filed on Nov. 8, 2019, the contents of which are all hereby incorporated by reference herein in their entireties.

TECHNICAL FIELD

The present disclosure relates to a positioning method using sidelink and an apparatus therefor, and more particularly, to a technology for performing on-demand relative positioning in a sidelink vehicle to everything (V2X) system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs (Radio Access Technologies). Accordingly, a communication system is under discussion, for which services or UEs sensitive to reliability and latency are considered. The next-generation RAT in which eMBB (enhanced Mobile Broadband) communication, mMTC (massive Machine Type Communication), and URLLC (Ultra-Reliable and Low Latency Communication) are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

In a conventional NR system, position information of a UE is measured and acquired through an infrastructure such as a BS or a GPS, which provides absolute position information such as observed time difference of arrival (OT-DoA), uplink time difference of arrival (UTDoA), or multiple roundtrip time (Multi-RTT).

In contrast, such a position measurement method of an infrastructure-based UE has a problem in that a normal operation is difficult in an environment in which it is difficult to ensure a line of sight (LOS) between a UE and a BS (or GPS) or the UE is present outside an infrastructure coverage or an infrastructure is not present, such as in an tunnel or a downtown densely populated with skyscrapers.

Thus, research has been actively conducted to measure and acquire relative position information of a UE like a sensor and to apply the information to various services in an environment in which it is difficult to acquire absolute position information of the UE. For example, in future autonomous vehicles (or autonomous driving robots), etc., relative position information between vehicles may be effectively used to prevent collision between vehicles, such as ensuring a safe distance between the vehicles by recognizing existence of nearby vehicles by a driving vehicle.

In contrast, in conventional positioning, a positioning UE acquires signals and information required for relative position measurement of a neighbor UE through a handshaking with the neighbor UE, and as a result, there is a problem in effectively applying the conventional positioning to various collision scenarios that occur between UEs installed on a high-speed vehicle.

Thus, there is a need for research for an on-demand relative positioning procedure. When the number of UEs is greater than the number of signals to be transmitted in one positioning reference signal (PRS) slot or is greater than the number of PRSs that are simultaneously transmitted and have mutual orthogonality, different UEs may select the same PRS and may then simultaneously transmit the PRS. Accordingly, there is a need for research for effectively minimizing a collision problem between PRSs.

DISCLOSURE

Technical Problem

An object to be achieved with the present disclosure is to provide a method and apparatus for measuring a relative position of a neighbor UE through sidelink by a positioning UE in an NR-V2X system.

Another object to be achieved with the present disclosure is to provide an on-demand relative position measurement method using sidelink and an apparatus therefor for preventing collision of response PRS between neighbor UEs through PRS muting based on an orientation angle.

Another object to be achieved with the present disclosure is to provide an on-demand relative position measurement method using sidelink and an apparatus therefor, which are applicable to various systems such as mmWAVE communication, licensed band communication, unlicensed band communication, and intelligent transport systems (ITS) band communication.

Another object to be achieved with the present disclosure is to provide a safe and reliable positioning service by effectively allocating a limited positioning resource to a neighbor vehicular UE to minimize collision between vehicular UEs.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect, a positioning method through sidelink in a vehicular user equipment (UE) may include receiving a request positioning reference signal (PRS) from a positioning UE, determining an orientation angle based on the positioning UE, based on the request PRS, determining a response PRS ID related to a request PRS ID of the request RRS based on the determined orientation angle, and transmitting a response PRS related to the determined response PRS ID.

According to an embodiment, the orientation angle may be determined based on an angle of arrival (AoA) that is an incident angle measured for the request PRS based on local coordinates or global coordinates.

According to an embodiment, the method may further include, when the local coordinates are used, receiving information on a heading angle of the positioning UE from the positioning UE, determining an AoA offset based on a heading angle of the vehicular UE and the heading angle of the positioning UE, and correcting the determined orientation angle based on the AoA offset.

According to an embodiment, any one of the response PRS ID may be selected from a response PRS ID group pre-mapped to the request PRS ID according to a predetermined orientation angle PRS muting rule.

According to an embodiment, the orientation angle PRS muting rule may define an orientation angle range allocated for each of the response PRS ID of the response PRS ID group.

According to an embodiment, the orientation angle PRS muting rule may define different orientation angle ranges for the respective response PRS ID groups.

According to another aspect, an apparatus for performing positioning through sidelink may include a radio frequency (RF) transceiver and a processor connected to the RF transceiver, wherein the processor receives a request positioning reference signal (PRS) from a positioning UE, determines an orientation angle based on the positioning UE, based on the request PRS, determines a response PRS ID related to a request PRS ID of the request RRS based on the determined orientation angle, and transmits a response PRS related to the determined response PRS ID.

According to an embodiment, the processor may determine the orientation angle based on an angle of arrival (AoA) that is an incident angle measured for the request PRS based on local coordinates or global coordinates.

According to an embodiment, when the processor uses the local coordinates, the processor may receive information on a heading angle of the positioning UE from the positioning UE, may determine an AoA offset based on a heading angle of the vehicular UE and the heading angle of the positioning UE, and may correct the determined orientation angle based on the AoA offset.

According to an embodiment, the processor may select any one of the response PRS ID from a response PRS ID group pre-mapped to the request PRS ID according to a predetermined orientation angle PRS muting rule.

According to an embodiment, the orientation angle PRS muting rule may define an orientation angle range allocated for each of the response PRS ID of the response PRS ID group.

According to an embodiment, the orientation angle PRS muting rule may define different orientation angle ranges for the respective response PRS ID groups.

Advantageous Effects

Various embodiments may advantageously provide a method and apparatus for measuring a relative position of a neighbor UE through sidelink by a positioning UE in an NR-V2X system.

Various embodiments may advantageously provide an on-demand relative position measurement method using sidelink and an apparatus therefor for preventing collision of response PRS between neighbor UEs through PRS muting based on an orientation angle.

Various embodiments may advantageously provide an on-demand relative position measurement method using sidelink and an apparatus therefor, which are applicable to various systems such as mmWAVE communication, licensed band communication, unlicensed band communication, and intelligent transport systems (ITS) band communication.

Various embodiments may advantageously provide an on-demand relative position measurement method using sidelink and an apparatus therefor for providing a safe and reliable positioning service by dynamically selecting a limited positioning resource according to a predefined allocation pattern by a neighbor vehicular UE to minimize collision of response PRS IDs between neighbor vehicular UEs.

Various embodiments may advantageously provide positioning of a target vehicle through communication between vehicular UEs without help of a surrounding infrastructure.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings are provided to provide an understanding of the present disclosure, and are intended to illustrate various embodiments of the present disclosure and, together with the description of the specification, explain the principles of the present disclosure.

BEST MODE

Figure 1:
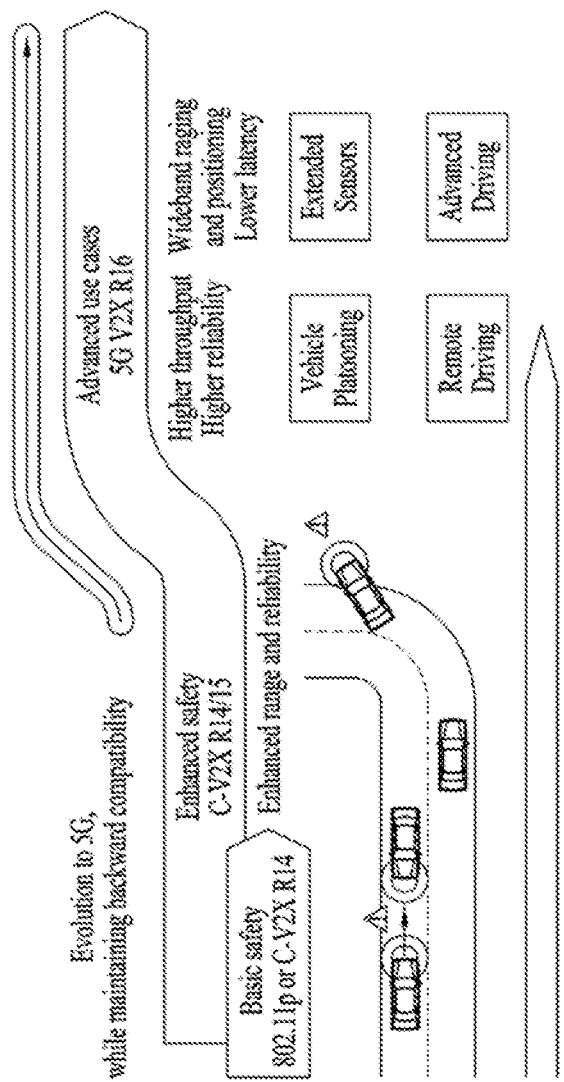
FIG. 1 is a diagram illustrating vehicle-to-everything (V2X) communication based on pre-new radio access technology (NR) RAT and V2X communication based on NR in comparison.

According to an aspect, a positioning method through sidelink in a user equipment (UE) of a vehicle may include receiving a request positioning reference signal (PRS) from a positioning UE, determining an orientation angle based on the positioning UE, based on the request PRS, determining a response PRS ID related to a request PRS ID of the request PRS based on the determined orientation angle, and transmitting a response PRS related to the determined response PRS ID.

Mode

A wireless communication system is a multiple access system that supports communication of multiple users by sharing available system resources (a bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB (enhanced Mobile Broadband) communication, mMTC (massive Machine Type Communication), and URLLC (Ultra-Reliable and Low Latency Communication) are considered is referred to as new RAT or NR(New Radio). In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 2:
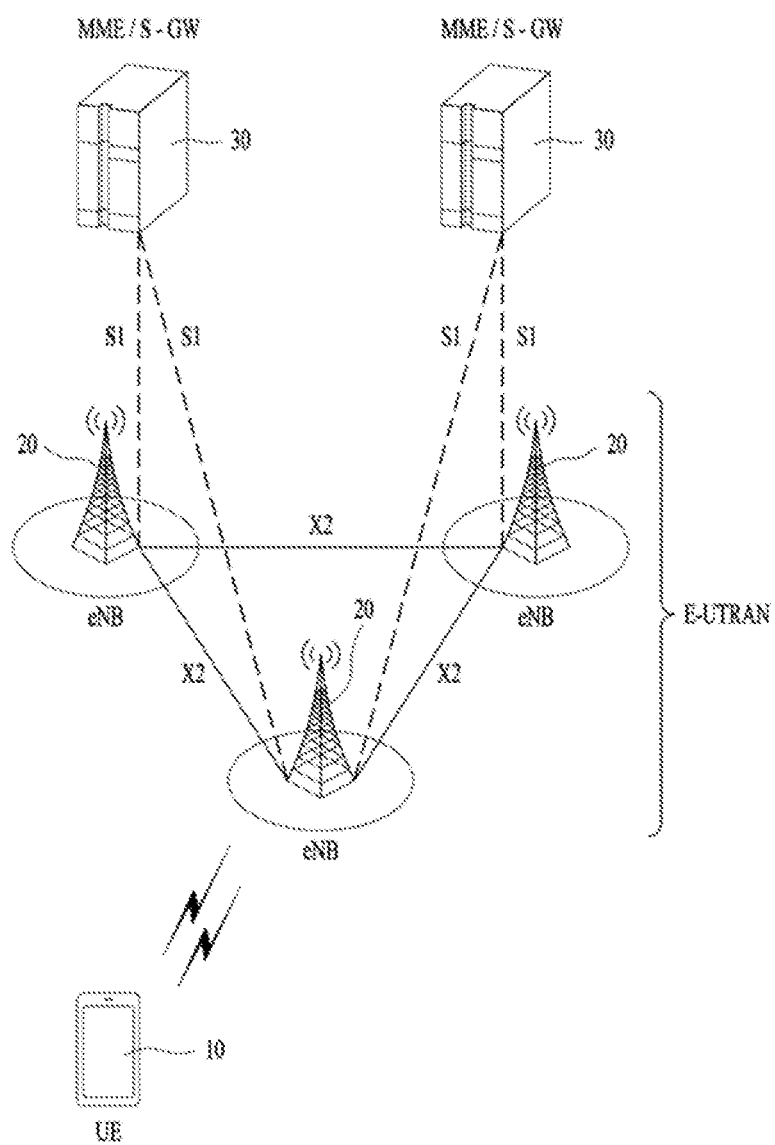
FIG. 2 is a diagram illustrating the structure of a long term evolution (LTE) system.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
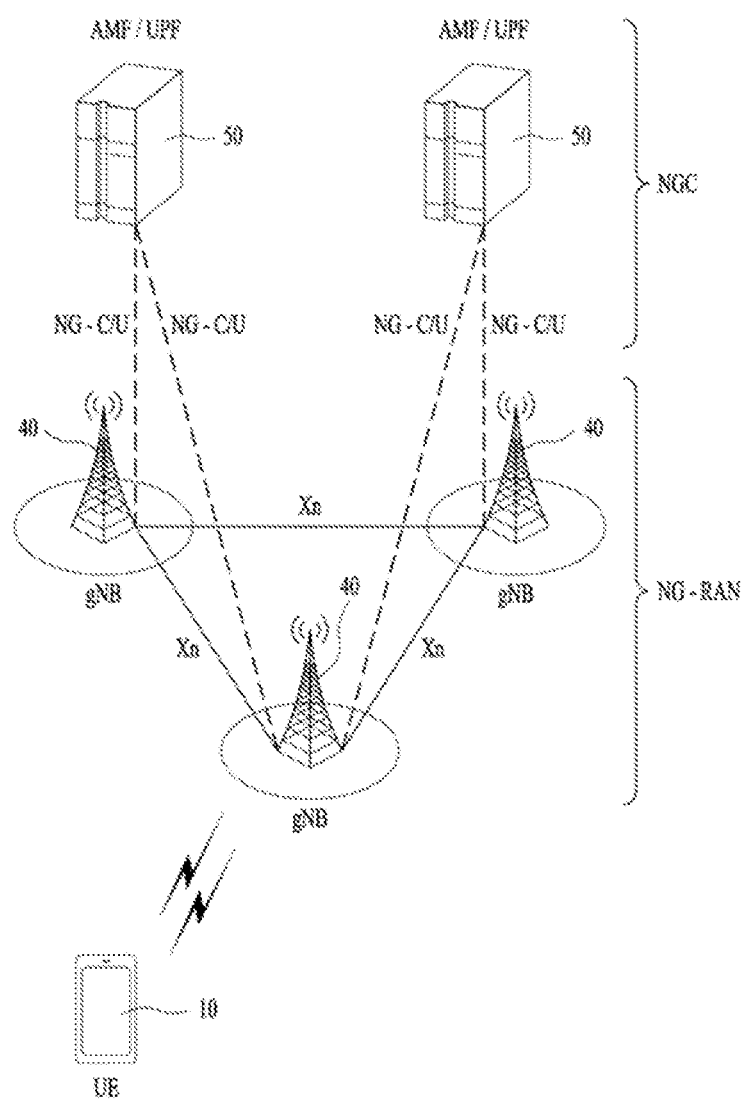
FIG. 3 is a diagram illustrating the structure of an NR system.

FIG. 3 illustrates the structure of an NR system

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
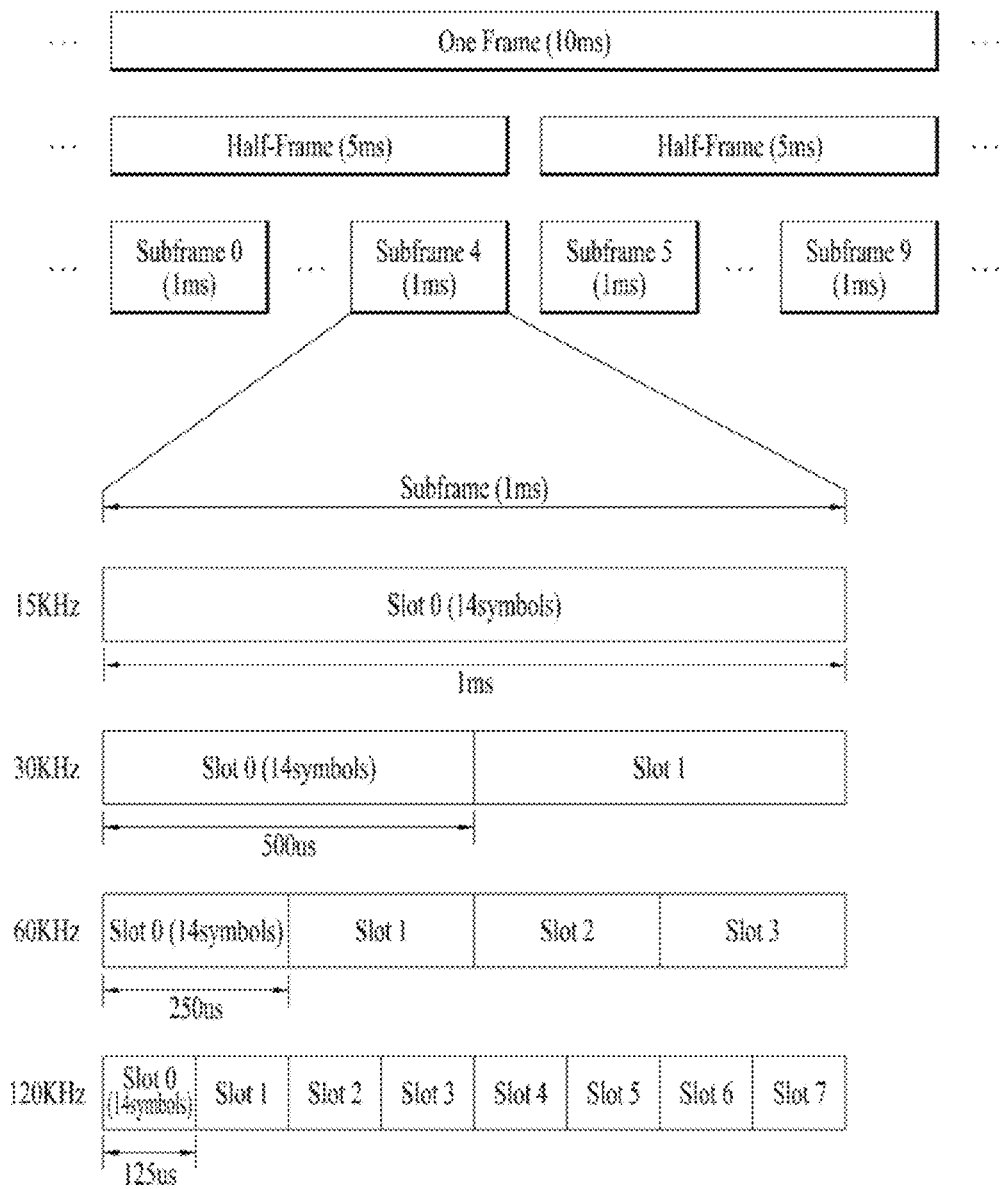
FIG. 4 is a diagram illustrating the structure of an NR radio frame.

FIG. 4 illustrates a radio frame structure in NR.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot N slot symb, the number of slots per frame $N^{frame,u}_{slot}$, and the number of slots per subframe $N^{subframe,u}_{slot}$ according to an SCS configuration μ in the NCP case.

TABLE 1

| SCS (15*2$^u$) | $N^{slot}_{symb}$ | $N^{frame, u}_{slot}$ | $N^{subframe, u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2$^u$) | $N^{slot}_{symb}$ | $N^{frame, u}_{slot}$ | $N^{subframe, u}_{slot}$ |
| --- | --- | --- | --- |
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
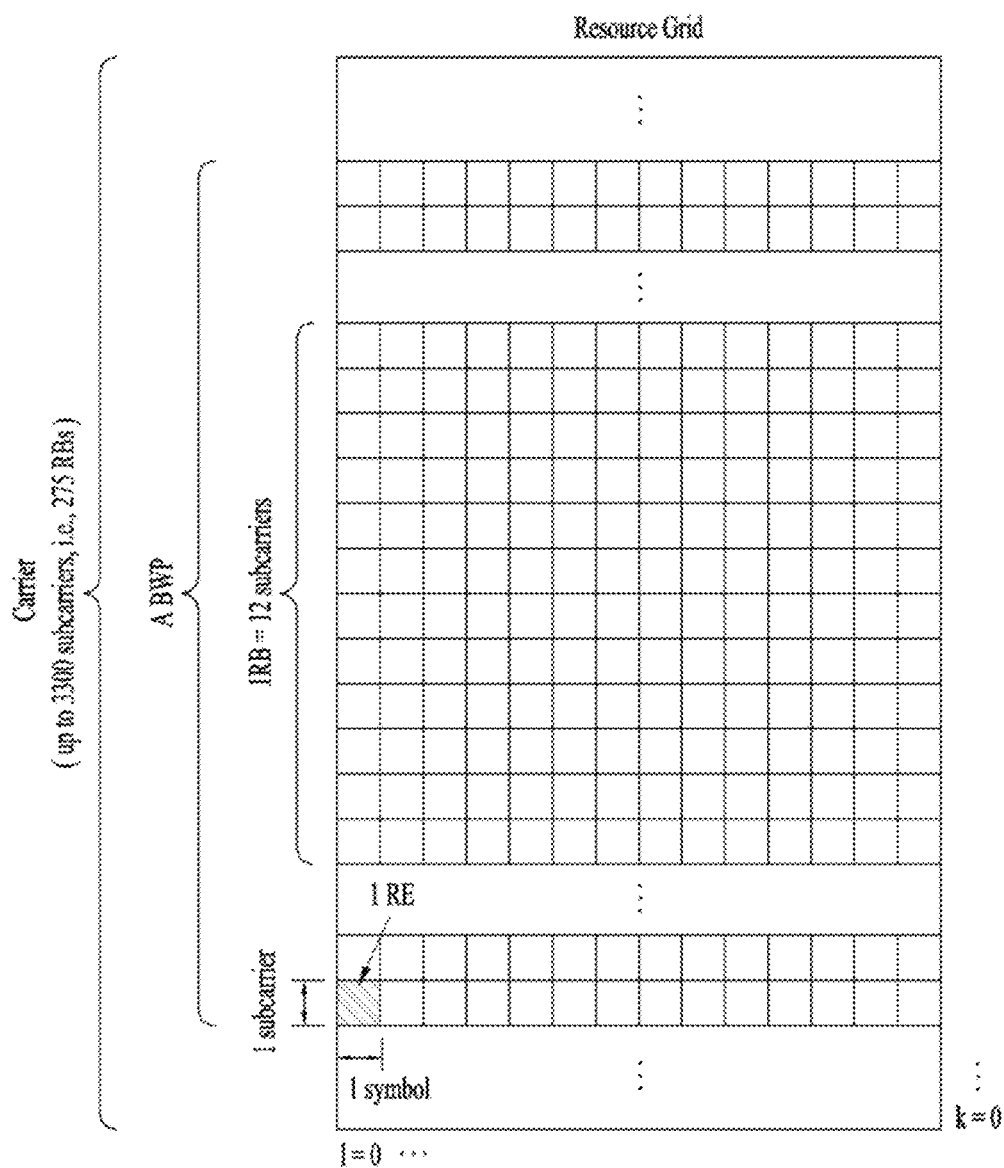
FIG. 5 is a diagram illustrating a slot structure in an NR frame

FIG. 5 illustrates a slot structure in an NR frame.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 6:
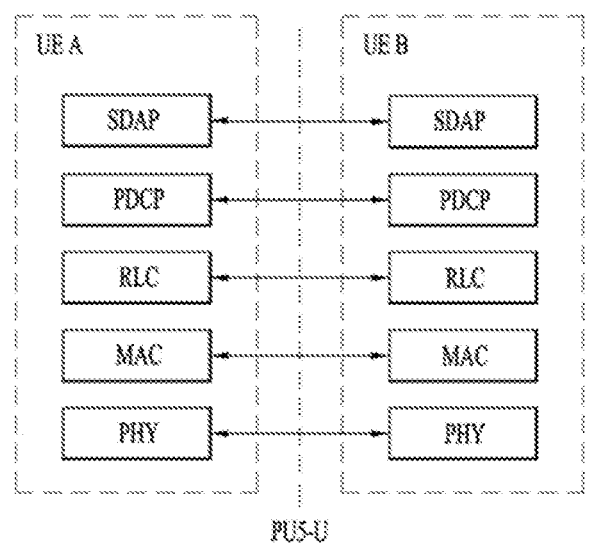
FIG. 6 is a diagram illustrating radio protocol architectures for sidelink (SL) communication.
Figure 6:
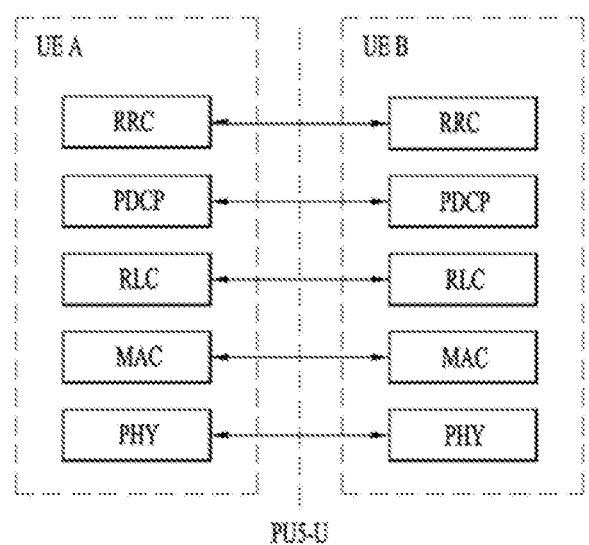

FIG. 6 illustrates a radio protocol architecture for SL communication Specifically, FIG. 6(a) illustrates a user-plane protocol stack in LTE, and FIG. 6(b) illustrates a control-plane protocol stack in LTE.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
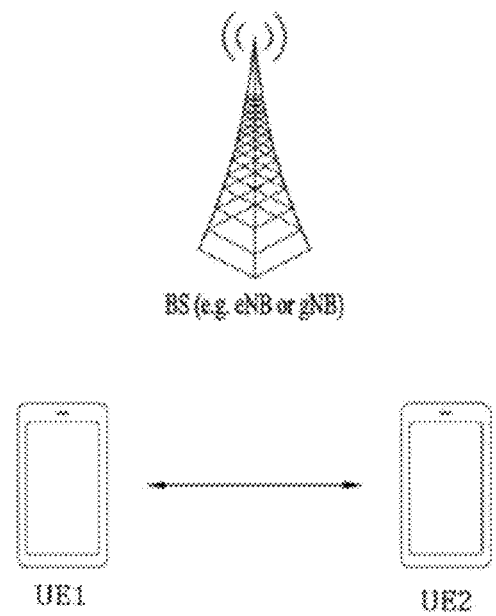
FIG. 7 is a diagram illustrating user equipments (UEs) which conduct V2X or SL communication between them

FIG. 7 illustrates UEs that conduct V2X or SL communication between them.

Referring to FIG. 7, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 8:
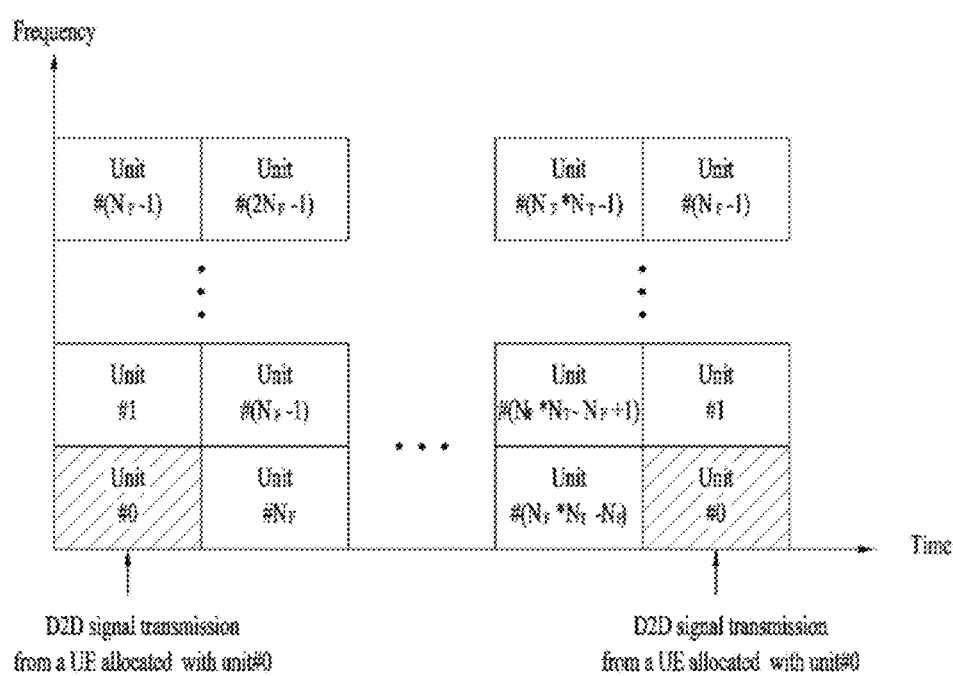
FIG. 8 is diagram illustrating resource units for V2X or SL communication

FIG. 8 illustrates resource units for V2X or SL communication.

Figure 13:
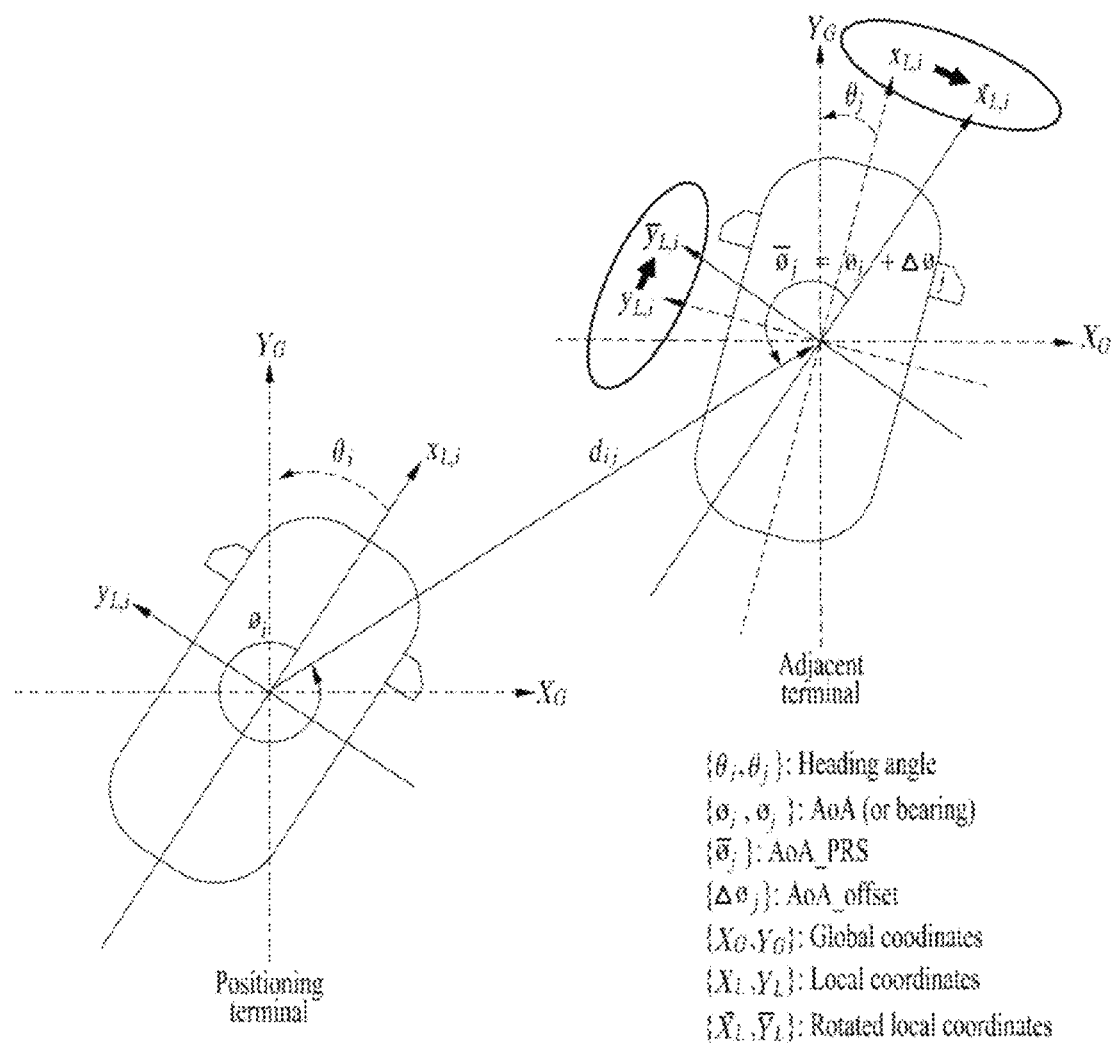
FIG. 13 is a diagram for explaining an AoA_PRS measurement method using local coordinates and global coordinates according to an embodiment.

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 9:
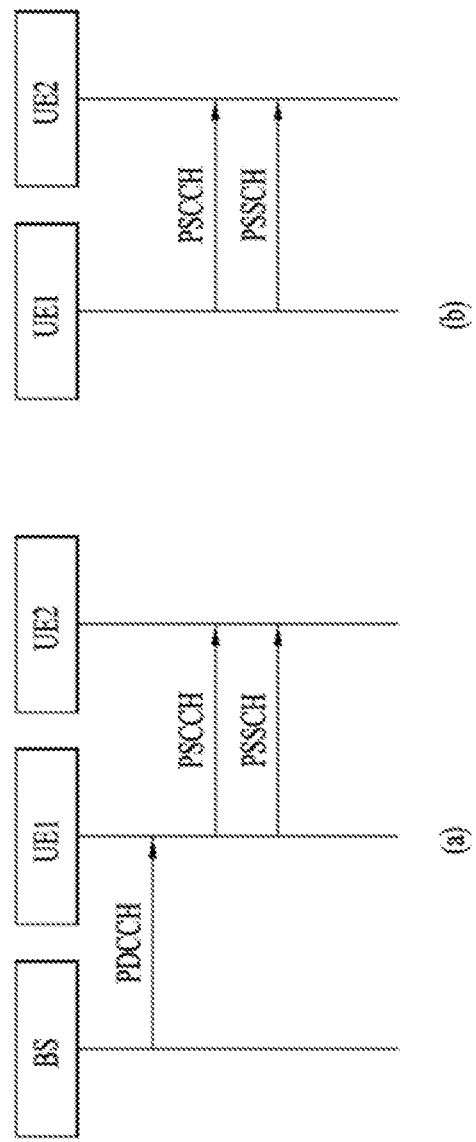
FIG. 9 is a diagram illustrating signal flows for V2X or SL communication procedures of a UE according to transmission modes

FIG. 9 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 9 (a) illustrates a UE operation related to LTE transmission mode 1 or LTE transmission mode 3. Alternatively, for example, FIG. 9 (a) illustrates a UE operation related to NR resource allocation mode 1. For example, LTE transmission mode 1 may be applied to general SL communication, and LTE transmission mode 3 may be applied to V2X communication.

For example, FIG. 9 (b) illustrates a UE operation related to LTE transmission mode 2 or LTE transmission mode 4. Alternatively, for example, FIG. 9 (b) illustrates a UE operation related to NR resource allocation mode 2.

Referring to FIG. 9 (a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 9 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources.

For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in physical layer, and a master information block-sidelink-V2X (MIB-SL-V2X) may be used in a radio link control (RLC) layer.

Tx/Rx Beam Sweep

When a very high frequency is used as in mmWave, beamforming may be generally used to overcome high pathloss. In order to use beamforming, first, the best beam pair needs to be detected among several beam pairs between a transmitting end and a receiving end. This process may be referred to as beam acquisition or beam tracking or beam tracking in terms of the receiving end. In particular, in mmWave, analog beamforming is used, and thus a vehicle needs to perform beam sweeping for switching beams in different directions at different times using an antenna array of the vehicle itself during the beam acquisition or the beam tracking.

Multiple Active Sidelink BWPs

In NR V2X, communication through support of a plurality of BWPs (i.e., support of a plurality of configured sidelink BWPs and/or support of a plurality of active sidelink BWPs) may be considered. This may be for supporting different numerologies or heterogeneous services/communications that require parameters and/or requirements or may also be for ICI reduction due to a reduced CP length.

Figure 10:
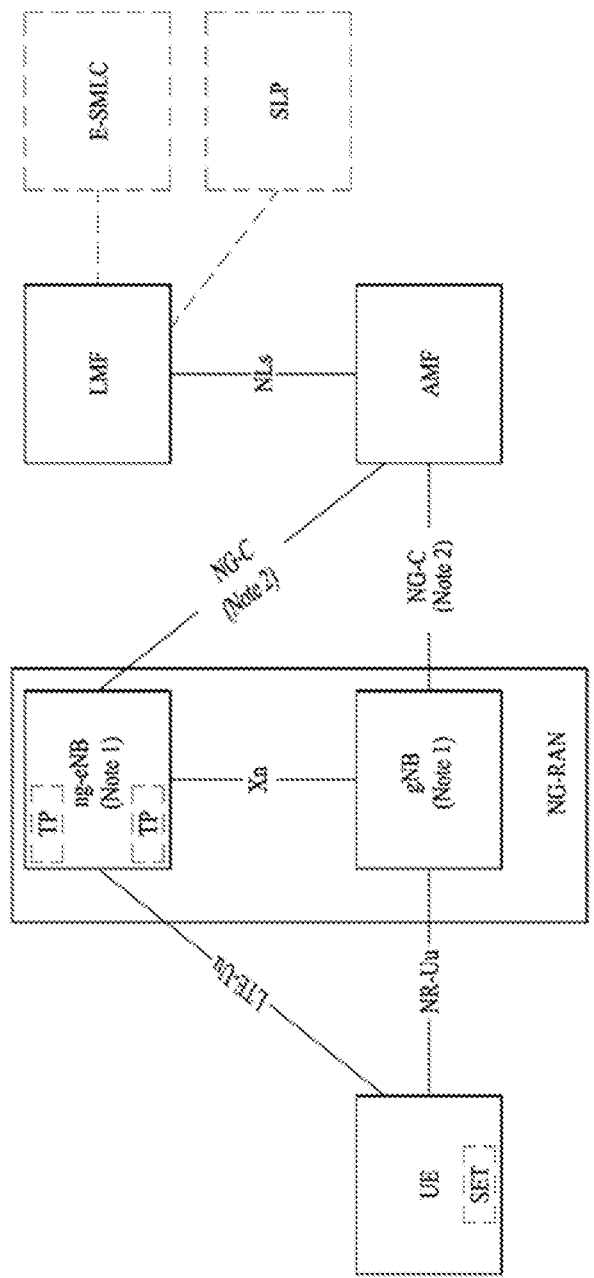
FIG. 10 illustrates an exemplary architecture of a 5G system capable of positioning a UE connected to an NG-RAN or an E-UTRAN according to an embodiment of the present disclosure.

FIG. 10 illustrates an exemplary architecture of a 5G system capable of positioning a UE connected to an NG-RAN or an E-UTRAN according to an embodiment of the present disclosure.

Referring to FIG. 10, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the L1VIF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 11:
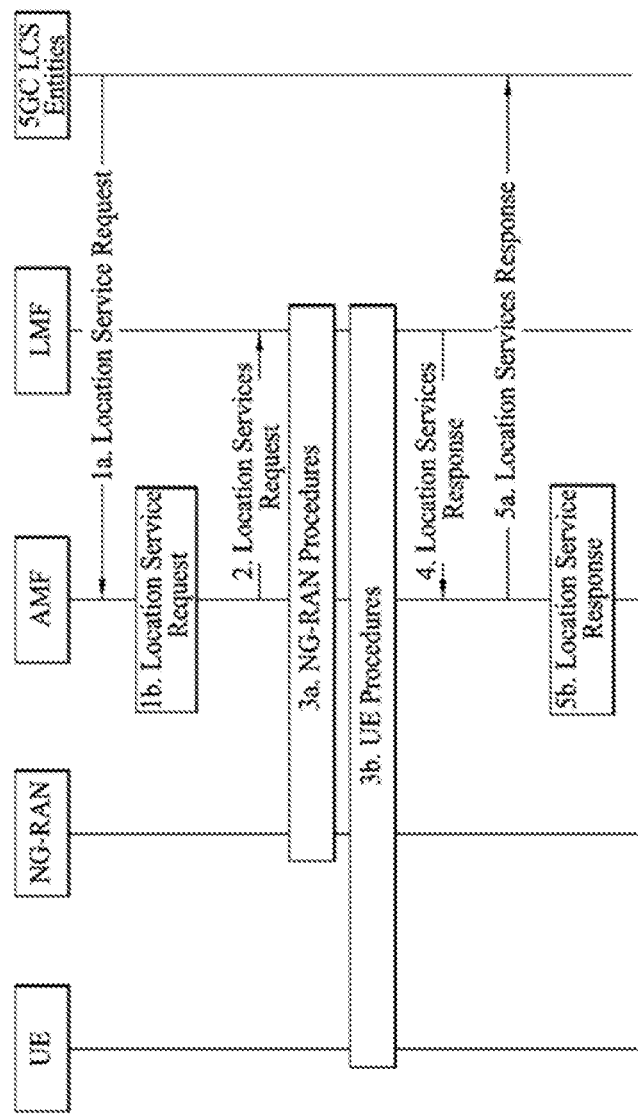
FIG. 11 illustrates exemplary implementation of a network for positioning a UE according to an embodiment of the present disclosure.

FIG. 11 illustrates exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 11. That is, FIG. 11 may be based on the assumption that the UE is in connected mode. However, the signaling connection may be released by the NG-RAN due to signaling and data deactivation during positioning.

Referring to FIG. 11, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an L1VIF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 24 is initiated in step 1a, the AMF may deliver the location service response to the 5GC entity such as the GMLC. When the procedure of FIG. 24 is initiated in step 1b, the AMF may use the location service response to provide the location service related to an emergency call or the like.

Embodiment 1

Hereinafter, an on-demand relative positioning method performed by a positioning UE to measure a relative position of a neighbor UE using sidelink in an NR-V2X system according to an embodiment will be described in detail.

The positioning UE may transmit a request PRS to a neighbor UE using a successfully reserved request PRS ID and the neighbor UE may transmit a response PRS in response thereto. In this case, when different neighbor UEs select the same response PRS ID and transmit response PRSs, collision between the response PRSs may occur.

The present embodiment may propose orientation angle PRS muting (or PRS muting using an orientation angle) as a method of effectively preventing collision between the response PRSs.

In the on-demand relative positioning described in the present embodiment(s), a request related operation and a response related operation between the positioning UE and the neighbor UE may be mainly predefined and preconfigured. A response PRS ID for responding to a request PRS ID may be previously mapped and configured, and thus there may be no need for reservation and assignment of the request PRS ID and the response PRS ID through conventional handshaking between the positioning UE and the neighbor UE. Scheduling based on the preconfigured request/response PRS mapping rule may be operated through the following two-step process. Here, the request/response PRS ID may include a PRS pattern to be defined in the frequency/time domain according to the mapping rule and transmission position information.

Figure 12:
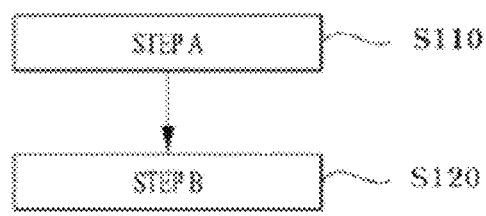
FIG. 12 is a diagram for explaining an orientation angle PRS muting procedure according to an embodiment.

FIG. 12 is a diagram for explaining an orientation angle PRS muting procedure according to an embodiment.

Referring to FIG. 12, the orientation angle PRS muting procedure may broadly include two steps.

A STEP A S110 may be a step of selecting a response PRS ID group related to a request PRS based on pre-configured request/response PRS mapping, and here, the response PRS ID group for a response PRS transmitted in response to the request PRS transmitted by the positioning UE may be previously mapped and configured. In this case, the response PRS ID group may include one or more response PRS IDs, and a neighbor UE that receives the request PRS may select one response PRS ID from the response PRS ID group related to the received request PRS ID and may then transmit the response PRS using the selected response PRS ID to the positioning UE.

A STEP B S120 may be a step of performing PRS muting using an orientation angle, and here, a plurality of neighbor UEs may select one response PRS ID from the response PRS ID group and may transmit the response PRS. An orientation angle at which the neighbor UE is positioned based on the positioning UE may be determined by measuring an angle of arrival (AoA) using the request PRS received from the positioning UE. Then, the neighbor UE may select a response PRS ID and a time, i.e., a transmission timing, which are to be used according to a preconfigured orientation angle PRS muting rule, and may transmit the response PRS. The orientation angle PRS muting proposed according to the present embodiment may be operated under the assumption that the positioning UE and the neighbor UE use the same direction coordinates and may be effectively applied to the case in which the number of neighbor UEs is greater than the number of response PRSs that are to be transmitted in one PRS slot and(or) are to be simultaneously transmitted and have mutual orthogonality.

The neighbor UE may measure the AoA through the request PRS received from the positioning UE and may select a response PRS ID through orientation angle PRS muting in order to minimize collision between response PRSs. In this case, in the orientation angle PRS muting, the neighbor UE positioned within a predetermined orientation angle range based on the positioning UE may transmit the response PRS using the same response PRS ID at different times under assumption that the positioning UE and the neighbor UE use the same direction coordinates.

Hereinafter, the STEP B 120 will be described in more detail.

First, a heading angle and an AoA (or bearing) that are required to match direction coordinates between the positioning UE and the neighbor UE and to pre-allocate a response PRS ID to be used depending on the orientation angle at which the neighbor UE is positioned based on the positioning UE will be described. Here, the direction coordinates may include local coordinates or global coordinates, which are operated by a vehicle itself, and the local coordinates may be differently configured and applied for respective UEs, and in contrast, the global coordinates may be applied in the same way to all the UEs.

FIG. 13 is a diagram for explaining an AoA_PRS measurement method using local coordinates and global coordinates according to an embodiment.

In detail, FIG. 13 is a diagram for explaining a method of measuring a heading angle and an AoA using local coordinates and global coordinates with respect to a positioning UE and one neighbor UE and a method of matching local coordinates of a neighbor UE with local coordinates of a positioning UE by the neighbor UE.

Referring to FIG. 13, $\{X_G, Y_G\}$ represents global coordinates $\{x,y\}$, and $\{x_L, y_L\}$ represents local coordinates $\{x,y\}$. The local coordinates between the positioning UE and the neighbor UE may or may not be the same. In this case, the x axis of the local coordinates may be configured by configuring a longer side of horizontal and vertical sides of the UE to the x axis or through other references.

$\{\theta_i, \theta_j\}$ may represent heading angles that are measured by the positioning UE and the neighbor UE, respectively. In this case, the heading angle may be an angle between the x axis of the local coordinates and the y axis of the global coordinates and may be measured counterclockwise.

$\{\varnothing_i, \varnothing_j\}$ may represent AoAs that are measured by the positioning UE and the neighbor UE, respectively. In this case, the AoA may be an incident angle measured counterclockwise with respect to the x axis of the local coordinates.

$\{\overline{\varnothing}_j\}$ may be an AoA (or AoA_PRS) that is corrected in a procedure in which the neighbor UE matches local coordinates thereof with local coordinates of the positioning UE and may be represented by $\overline{\varnothing}_j = \varnothing_j + \Delta\varnothing_j$ that is an incident angle measured counterclockwise based on the x-axis of the local coordinates of the positioning UE. In this case, the AoA_PRS may represent a direction in which the neighbor UE is positioned based on the positioning UE and may be used to select the response PRS ID. A method of selecting the response PRS ID using the AoA_PRS will be described below in detail.

$\{\overline{x}_L, \overline{y}_L\}$ may represent local coordinates corrected using a heading angle transmitted from the positioning UE by the neighbor UE, and as a result, may have the same local coordinates as the positioning UE.

$\{\Delta\varnothing_j\}$ may represent an AoA offset between $\varnothing_j$ and $\overline{\varnothing}_j$ and may be calculated according to $\Delta\varnothing_j = \theta_i - \theta_j$.

In FIG. 13, when the global coordinates are applied to the positioning UE and the neighbor UE, the neighbor UE may be said to be positioned in a direction $\varnothing_j + \pi/2 - \theta_j$ based on the positioning UE. In this case, when a direction in which the neighbor UE is positioned is determined using the global coordinates, the heading angle from the positioning UE may not be required.

Hereinafter, a method of pre-allocating a response PRS ID to be used depending on an orientation angle at which the neighbor UE is positioned based on the proposed positioning UE and a method of selecting a response PRS ID through the AoA_PRS and the proposed orientation angle PRS muting method will be described. In this case, the orientation angle measured by the neighbor UE may refer to the AoA_PRS corrected in consideration of the heading angle received from the positioning UE with respect to an AoA value measured using the request PRS.

Figure 14:
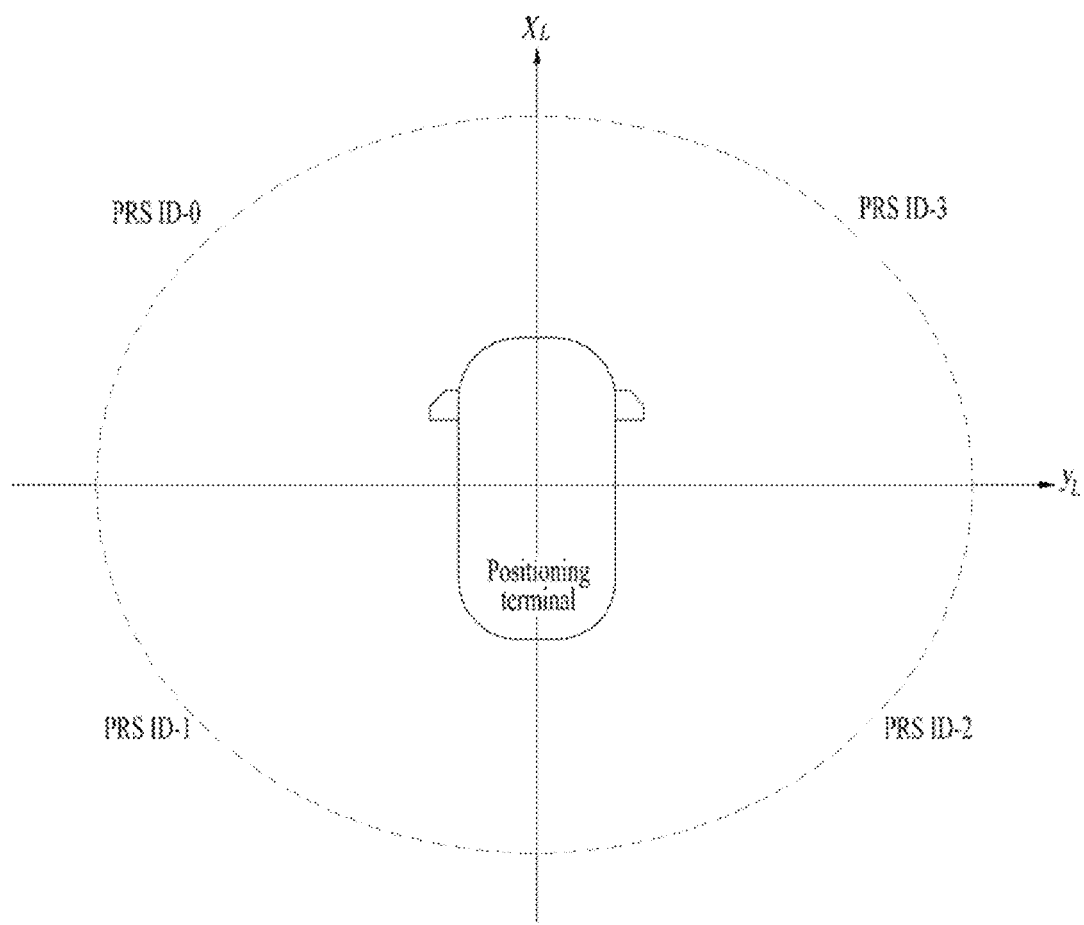
FIG. 14 is a diagram for explaining a method of allocating and preconfiguring an AoA_PRS based response PRS ID according to an embodiment.

FIG. 14 is a diagram for explaining a method of allocating and preconfiguring an AoA_PRS based response PRS ID according to an embodiment.

In detail, FIG. 14 shows an embodiment in which four different response PRS IDs (or PRS IDs) having mutual orthogonality are allocated to four orientation angles based on local coordinates of the positioning UE.

Table 5 shows relationships between orientation angles and the respective response PRS IDs shown in FIG. 14 and shows an embodiment in which different response PRS IDs are allocated to four orientation angles.

TABLE 5

| Response PRS ID | Orientation angle ($\varnothing$), $\varphi = 2\pi/N$ (N = 4) |
|---|---|
| PRS ID-0 | $0 \leq \varnothing < \varphi$ |
| PRS ID-1 | $\varphi \leq \varnothing < 2\varphi$ |
| PRS ID-2 | $2\varphi \leq \varnothing < 3\varphi$ |
| PRS ID-3 | $3\varphi \leq \varnothing < 4\varphi$ |

For example, referring to FIG. 14 and Table 5, when an orientation angle measured by the neighbor UE is positioned within a range $\varphi \leq \varnothing < 2\varphi$, the neighbor UE may select a response PRS ID-1 and may transmit the response PRS.

Figure 15:
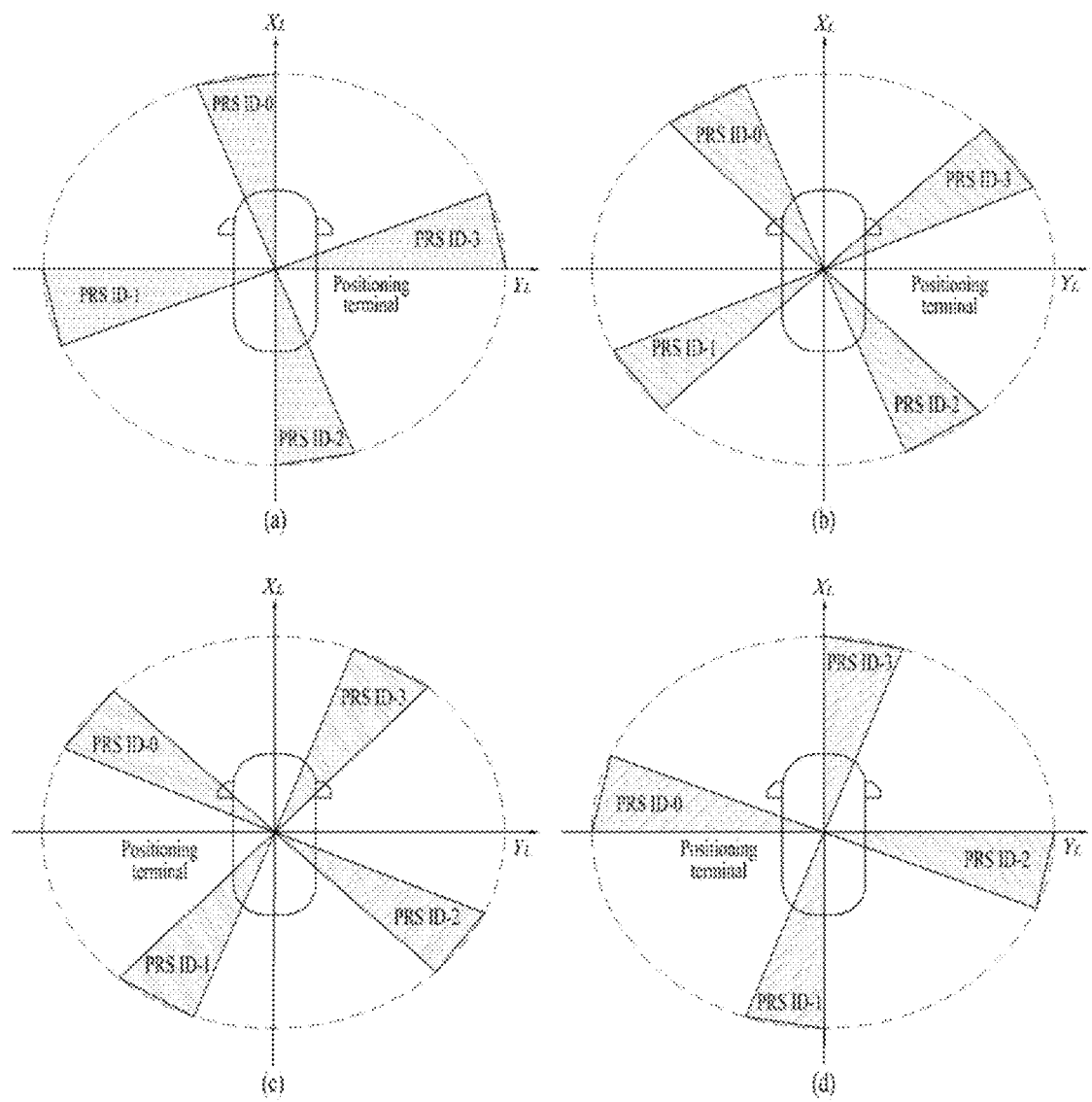
FIG. 15 is a diagram for explaining a method of selecting a response PRS ID through an AoA_PRS and an orientation angle PRS muting method according to an embodiment.

FIG. 15 is a diagram for explaining a method of selecting a response PRS ID through an AoA_PRS and an orientation angle PRS muting method according to an embodiment.

Referring to FIG. 14 and Table 5 above, as the number of neighbor UEs based on the positioning UE increases, the probability that different neighbor UEs select the same response PRS ID may increase. That is, the probability of collision of response PRSs of the neighbor UE may increase.

As the number of the neighbor UEs increases, the problem in terms of a high probability of collision of the response PRSs may be minimized by further subdividing the orientation angle at which the neighbor UE is to be positioned as shown in FIG. 15 and Table 6 below.

TABLE 6

| PRS group | Response PRS ID | orientation angle ($\varnothing$), $\varphi = 2\pi/N$ (N = 16) |
|---|---|---|
| PRS group-0 | PRS ID-0 | $0 \leq \varnothing < \varphi$ |
| | PRS ID-1 | $4\varphi \leq \varnothing < 5\varphi$ |
| | PRS ID-2 | $8\varphi \leq \varnothing < 9\varphi$ |
| | PRS ID-3 | $12\varphi \leq \varnothing < 13\varphi$ |
| PRS group-1 | PRS ID-0 | $\varphi \leq \varnothing < 2\varphi$ |
| | PRS ID-1 | $5\varphi \leq \varnothing < 6\varphi$ |
| | PRS ID-2 | $9\varphi \leq \varnothing < 10\varphi$ |
| | PRS ID-3 | $13\varphi \leq \varnothing < 14\varphi$ |
| PRS group-2 | PRS ID-0 | $2\varphi \leq \varnothing < 3\varphi$ |
| | PRS ID-1 | $6\varphi \leq \varnothing < 7\varphi$ |
| | PRS ID-2 | $10\varphi \leq \varnothing < 11\varphi$ |
| | PRS ID-3 | $14\varphi \leq \varnothing < 15\varphi$ |
| PRS group-3 | PRS ID-0 | $3\varphi \leq \varnothing < 4\varphi$ |
| | PRS ID-1 | $7\varphi \leq \varnothing < 8\varphi$ |
| | PRS ID-2 | $11\varphi \leq \varnothing < 12\varphi$ |
| | PRS ID-3 | $15\varphi \leq \varnothing < 16\varphi$ |

Compared with Table 1 in which the orientation angle at which the neighbor UE is to be positioned is subdivided into 4, Table 2 shows an embodiment in which the orientation angle at which the neighbor UE is to be positioned is subdivided into 16. However, when the number of response PRSs that are to be transmitted in one PRS slot and/or are to be simultaneously transmitted and have mutual orthogonality is smaller than the number of the subdivided orientation angles, there may be still a problem in that it is difficult to avoid a collision situation between response PRSs by selecting the same response PRS ID by neighbor UEs.

In order to overcome the above problem, the orientation angle PRS muting may use a PRS group concept in that respective PRS groups include the same response PRS ID group but are configured with different orientation angles. In this case, in the orientation angle PRS muting method according to the present embodiment, while one PRS group is transmitted, response PRSs of other PRS groups may be controlled not to be transmitted.

For example, referring to FIG. 15 and Table 6, neighbor UEs positioned at orientation angles ($0 \leq \varnothing < \varphi$), ($\varphi \leq \varnothing < 2\varphi$), ($2\varphi \leq \varnothing < 3\varphi$), and ($3\varphi \leq \varnothing < 4\varphi$) based on the positioning UE may use the same PRS ID-0 but may transmit response PRSs at different times or through different PRS slots, and thus collision between response PRSs due to use of the same response PRS ID may be prevented.

Referring to FIG. 15, a reference numeral (a) represents PRS group-0 to be transmitted during a PRS slot-(t) (or a PRS slot time t), and in this case, transmission of other PRS groups may not be permitted. In contrast, a reference numeral (b) represents PRS group-1 to be transmitted during a PRS slot-(t+1), a reference numeral (c) represents PRS group-2 to be transmitted during a PRS slot-(t+2), and a reference numeral (d) represents PRS group-2 to be transmitted during a PRS slot-(t+3).

The orientation angle PRS muting method described above with reference to FIG. 15 may be repeatedly performed with a predetermined period, and in this case, a PRS muting period may be determined and changed periodically or aperiodically by a location server/LMF and/or a BS, but this is merely one embodiment, and a vehicle, i.e., a neighbor UE or a positioning UE may autonomously determine and change the PRS muting period.

Embodiment 2

The present embodiment proposes a heading angle-based PRS muting method in consideration of a movement direction of a UE.

PRS muting in conventional network-based NR positioning may transmit the same PRS ID through different PRS slots between BSs, which is expected to collide, in order to minimize collision between PRSs that occurs while different BSs transmit the same PRS ID during a PRS slot. In this case, PRS muting related coordination between the BSs may be controlled by a central coordinator such as a network. In contrast, there is a need for a method of effectively coordinating PRS muting between UEs in an ad-hoc network environment without a central coordinator such as a network.

When a UE transmits a PRS for absolute positioning or relative positioning in NR-V2X positioning, if the number the UEs is greater than the number of PRSs that are to be transmitted in one PRS slot and(or) are to be simultaneously transmitted and have mutual orthogonality, collision may be caused. The present embodiment proposes a heading angle based PRS muting method in consideration of a movement direction of a UE as a method for minimizing collision between the PRSs.

The main features of the heading angle based PRS muting method may be summarized as follows:

1) Heading angle configuration method in consideration of a surrounding environment in which a UE moves:
   When a UE is mounted in a vehicle, coordination of PRS muting may be performed in consideration of various driving environments such as a lane (a right lane or a left lane) on which the vehicle travels or intersection entrance, and in this case, PRS muting coordination of each vehicle may be determined depending on a heading angle of an ego-vehicle. Here, the ego-vehicle may refer to a subject vehicle, i.e., a positioning vehicle and may be compared with a neighbor vehicle.

2) Heading angle based PRS muting method by ego-vehicle: When a UE is mounted in a vehicle, a period with which each vehicle transmits a PRS may be determined depending on a heading angle of an ego-vehicle. According to an embodiment, a vehicle traveling on a right lane and a vehicle traveling on a left lane may transmit the same PRS ID at different times or through different PRS slots. In this case, both lanes may be distinguished through the heading angle. That is, the vehicle traveling on the right lane and the vehicle traveling on the left lane may travel in opposite directions and may be distinguished through the heading angle.

Hereafter, a heading angle based PRS muting method according to the present embodiment will be described in more detail with reference to drawings.

Hereafter, a heading angle configuration method in consideration of a surrounding environment in which a UE moves will be described prior to a description of the proposed heading angle based PRS muting method.

Figure 16:
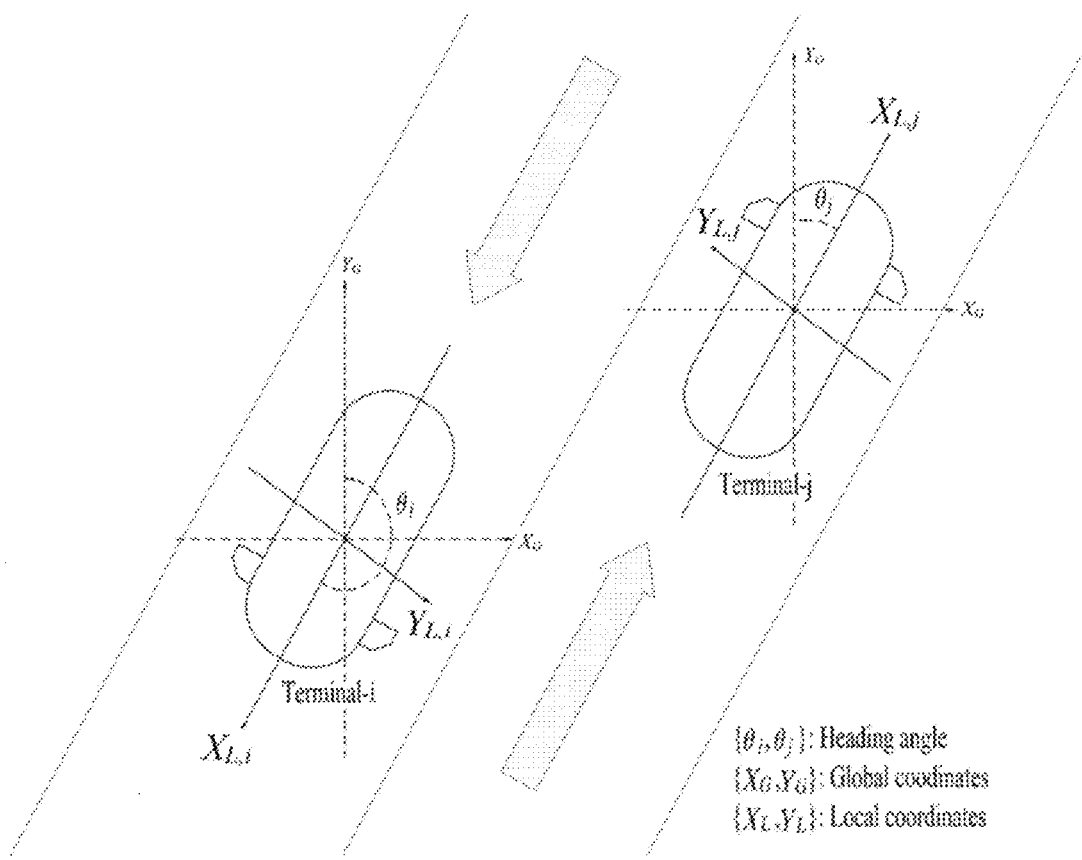
FIG. 16 is a diagram for explaining a method of distinguishing a lane using a heading angle of a vehicle according to an embodiment.

FIG. 16 is a diagram for explaining a method of distinguishing a lane using a heading angle of a vehicle according to an embodiment.

In detail, FIG. 16 shows an embodiment of distinguishing both lanes using a heading angle with respect to a vehicle traveling on a right lane and a vehicle traveling on a left lane when a UE is a vehicle.

Referring to FIG. 16, $\{X_G, Y_G\}$ represents global coordinates $\{x,y\}$ and $\{x_L, y_L\}$ represents local coordinates $\{x,y\}$. The local coordinates between the positioning UE and the neighbor UE may or may not be the same. In this case, the x axis of the local coordinates may be configured by configuring a longer side of horizontal and vertical sides of the UE to the x axis or through other references local coordinates.

$\{\theta_i, \theta_j\}$ may represent heading angles that are measured by the positioning UE and the neighbor UE, respectively. In this case, the heading angle may be an angle between the x axis of the local coordinates and the y axis of the global coordinates and may be measured counterclockwise.

As seen from FIG. 16, the vehicle traveling on the right lane and the vehicle traveling on the left lane may travel in opposite directions, and as a result, both lanes may be distinguished using a heading angle. In this case, in the present embodiment(s), the heading angle may be used to distinguish both lanes rather than distinguishing right and left lanes.

Hereinafter, a heading angle based PRS muting method by an ego-vehicle will be described in more detail. In FIG. 16, a PRS transmission period for UEs moving in opposite directions may be determined depending on heading angles of the UEs. For example, the same PRS ID may be transmitted at different times or through different PRS slots that are preconfigured depending on the heading angle.

Figure 17:
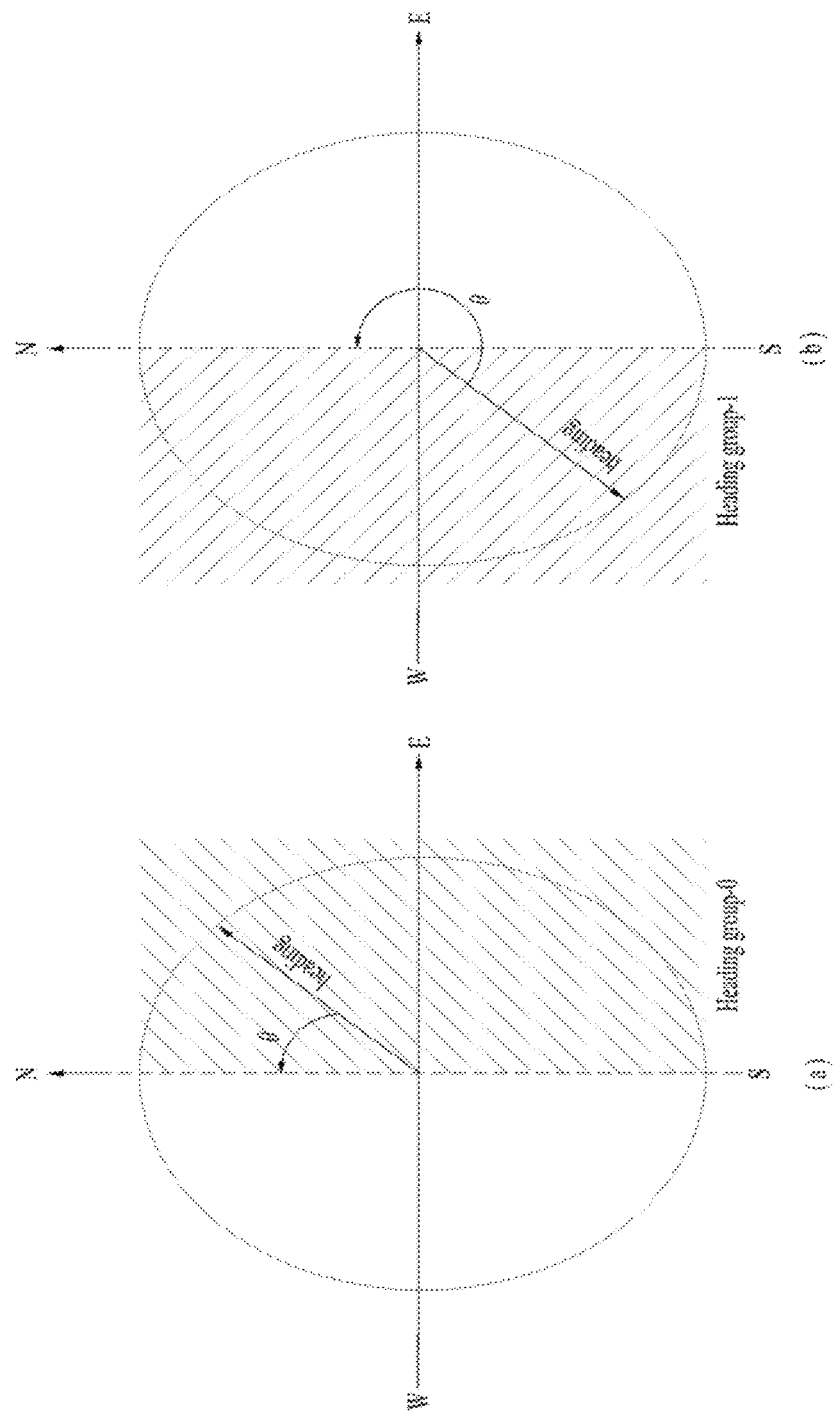
FIG. 17 is a diagram for explaining a heading angle based PRS muting method according to an embodiment.

FIG. 17 is a diagram for explaining a heading angle based PRS muting method according to an embodiment.

In the heading angle based PRS muting, respective heading groups may transmit PRSs using the same PRS ID group at different times. That is, while a vehicle belonging to a specific heading group transmits a PRS, a vehicle belonging to another heading group may not transmit a PRS.

Table 7 below shows a relationship between a heading group and a heading angle.

TABLE 7

| Heading group | Heading Angle ($\theta$) |
|---|---|
| Heading group-0 | $(0 + \Delta) \mod 2\pi \leq \theta < (\pi + \Delta) \mod 2\pi$ |
| Heading group-1 | $(\pi + \Delta) \mod 2\pi \leq \theta < (2\pi + \Delta) \mod 2\pi$ |

As an embodiment related to an operation, a moving UE may determine a heading group to which a heading angle of the UE belongs before transmitting a PRS. That is, when the heading angle of the UE satisfies a condition $((0+\Delta) \mod 2\pi \leq \theta < (\pi+\Delta) \mod 2\pi)$, the UE may determine that the heading angle of the UE belongs to a $0^{th}$ heading group (or heading group-0). In contrast, when the heading angle of the UE satisfies a condition $((\pi+\Delta) \mod 2\pi \leq \theta (2\pi+\Delta) \mod 2\pi)$, the UE may determine that the heading angle of the UE belongs to a first heading group (or heading group-0). Then, the UE may follow a predefined PRS muting operation related to each heading group.

In Table 7 above, $\Delta$ is an offset for a heading angle, and in the case of $\Delta > 0$, a condition that satisfies the heading group may be rotated by $\Delta$.

In FIG. 17, a reference numeral (a) shows heading group-0 for transmitting a PRS during a PRS slot-(t) (or a PRS slot time t) in the case of $\Delta=0$, and in this case, transmission of other PRS groups may not be permitted. In contrast, a reference numeral (b) represents heading group-1 for transmitting a PRS during a PRS slot-(t+1).

The heading angle based PRS muting described above with reference to FIG. 17 may be repeatedly performed with a predetermined period. In this case, a PRS muting period may be determined and changed periodically or aperiodically by a location server/LMF and/or a BS, but this is merely one embodiment, and a vehicle may autonomously determine and change the PRS muting period.

Figure 18:
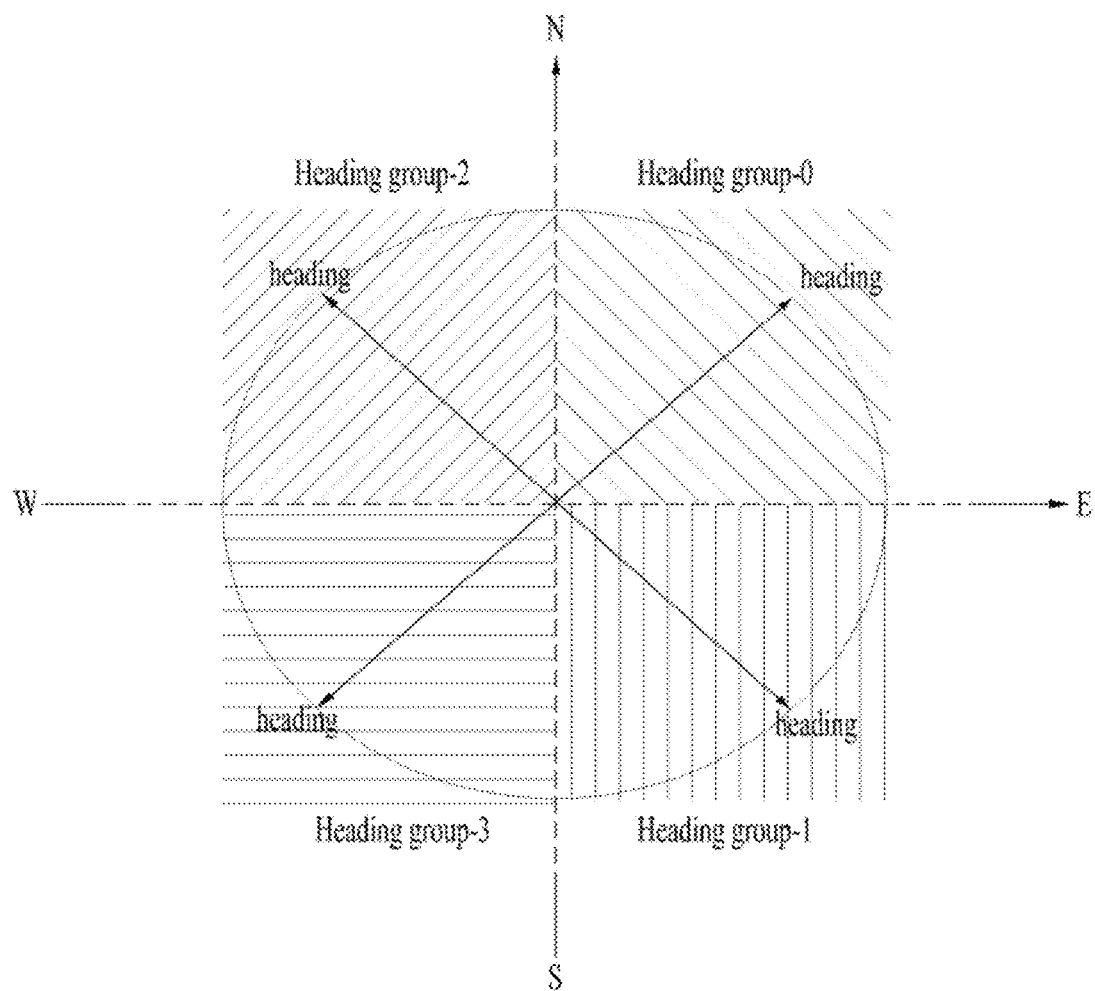
FIG. 18 is a diagram for explaining a heading angle based PRS muting method in consideration of an intersection according to an embodiment.

FIG. 18 is a diagram for explaining a heading angle based PRS muting method in consideration of an intersection according to an embodiment.

In detail, FIG. 18 is a diagram for explaining an embodiment of a heading angle based PRS muting method in consideration of an intersection having four different driving directions.

Table 8 below shows a relationship between a heading group and a heading angle in consideration of an intersection.

TABLE 8

| Heading group | Heading Angle ($\theta$) |
|---|---|
| Heading group-0 | $(0 + \Delta) \mod 2\pi \leq \theta < (\pi/2 + \Delta) \mod 2\pi$ |
| Heading group-1 | $(\pi/2 + \Delta) \mod 2\pi \leq \theta < (\pi + \Delta) \mod 2\pi$ |
| Heading group-2 | $(3\pi/2 + \Delta) \mod 2\pi \leq \theta < (2\pi + \Delta) \mod 2\pi$ |
| Heading group-3 | $(3\pi/2 + \Delta) \mod 2\pi \leq \theta < (\pi + \Delta) \mod 2\pi$ |

Referring to FIG. 18 and Table 8, when a UE is a vehicle, the UE may determine a heading group to which a heading angle of the UE belongs and may then transmit PRSs at different times or through different PRS slots that are preconfigured depending on the heading group.

Hereinafter, a generalized heading angle based PRS muting method in a road environment having N different driving directions will be described based on the embodiment of FIGS. 17 and 18. A generalized relationship between a heading group-P and a heading angle from Tables 7 and 8 may be represented as follows.

$$\left(\frac{2\pi}{N}(p)+\Delta\right) \bmod 2\pi \le \theta < \left(\frac{2\pi}{N}(p+1)+\Delta\right) \bmod 2\pi, \quad p=0,\ldots,N-1$$

From Equation (1), a moving UE may determine whether a heading angle thereof satisfies a condition of a heading group-P before transmitting a PRS and may transmit the PRS during a time in which PRS transmission for a corresponding heading group is permitted or a PRS slot.

Figure 19:
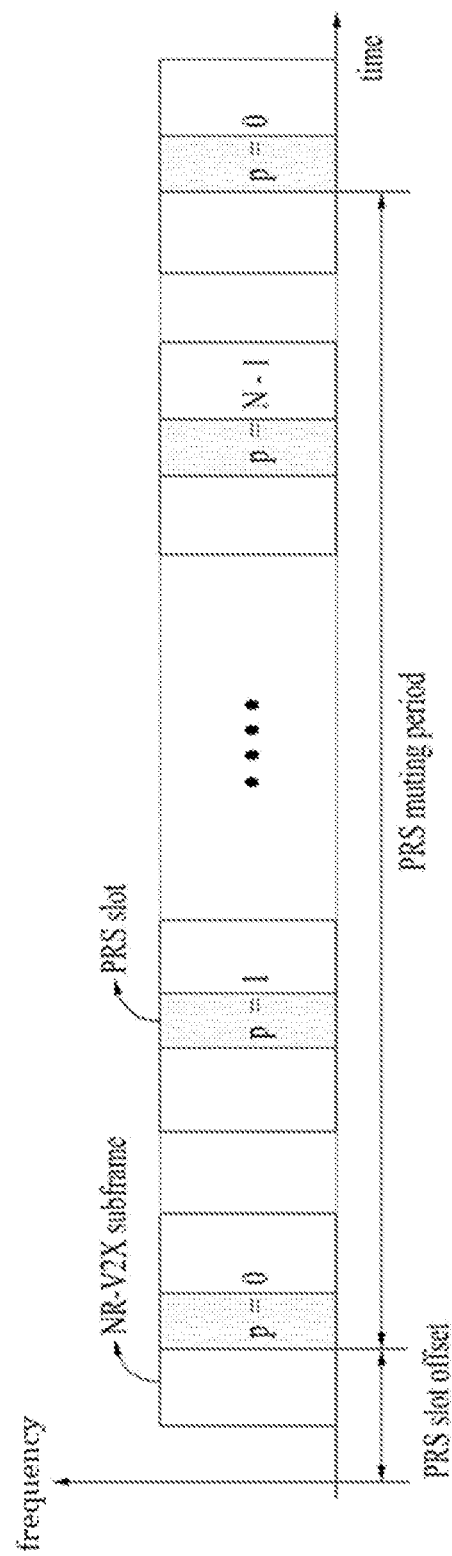
FIG. 19 is a diagram for explaining a generalized heading angle based PRS muting method according to an embodiment.

FIG. 19 is a diagram for explaining a generalized heading angle based PRS muting method according to an embodiment.

In detail, FIG. 19 is a diagram of a generalized heading angle based PRS muting method that is sequentially performed at a muting order between heading groups-P from p=0 to p=N−1. Here, the muting order between the heading groups-P may proceed in a preconfigured random pattern. As seen from FIG. 19, during a PRS slot in which PRS transmission of the heading group-P is permitted, PRS transmission of other heading groups may not be permitted. The PRS muting in FIG. 19 may be repeatedly performed with a predetermined period, and in this case, a PRS muting period may be determined and changed periodically or aperiodically by a location server/LMF and/or a BS, but this is merely one embodiment, and a vehicle may autonomously determine and change the PRS muting period.

Hereinafter, a default PRS muting operation will be described. The default PRS muting operation may refer to PRS muting operated as a fallback when it is not possible to measure a heading angle, the reliability of the measured heading angle is low, heading angle update is stopped, or a UE such as a vehicle is first turned on. The default PRS muting may be configured and operated using various methods like in the following embodiment.

Method 1: PRS muting off (or PRS muting with N=1): A PRS muting off method may not use PRS muting. This may correspond to the case of N=1 in Equation, and the PRS muting may be operated when a heading angle satisfies a condition 0c≤θ<2π, i.e., irrespective of the heading angle.

Method 2: PRS muting holding: The PRS muting may be operated using a lastly measured heading angle value, a heading angle value before the reliability of the heading angle is lowered, or a lastly updated heading angle.

The aforementioned embodiment(s) propose a PRS muting method in consideration of a heading angle of an ego-vehicle in order to minimize collision between PRSs that occurs when the number of UEs is greater than the number of PRSs that are to be transmitted in one PRS slot and/or to be simultaneously transmitted and have mutual orthogonality if a UE participating in NR-V2X positioning transmits a PRS. In the heading angle based PRS muting method, PRS muting between UEs may be effectively coordinated in an ad-hoc network environment without a central coordinator.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
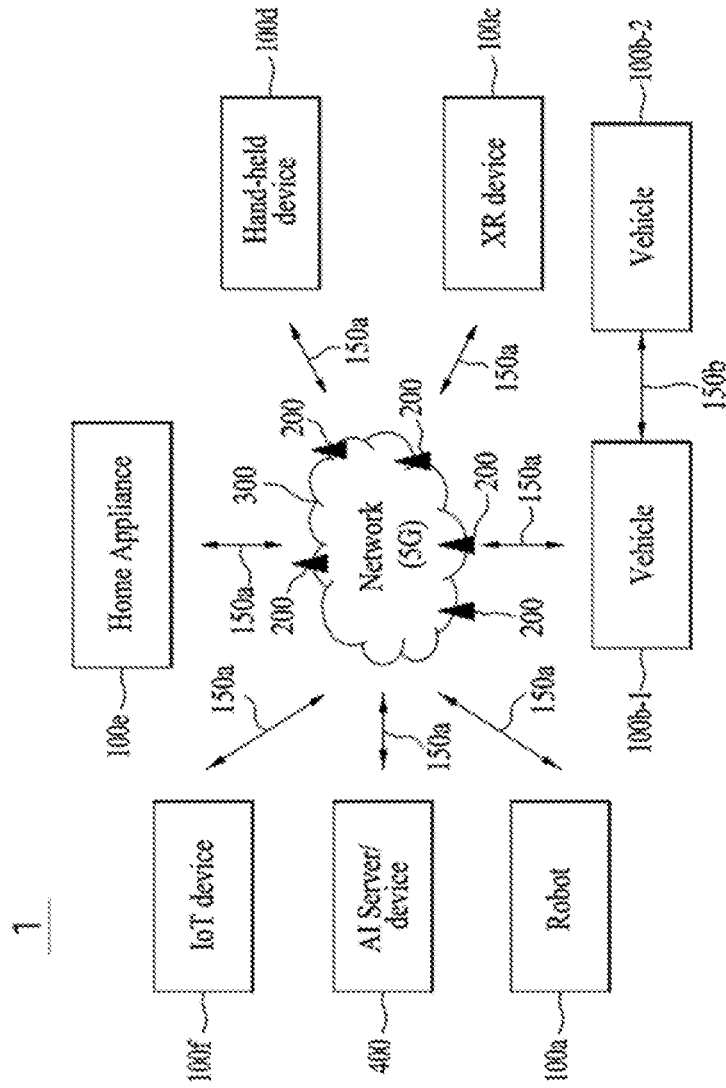
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 21:
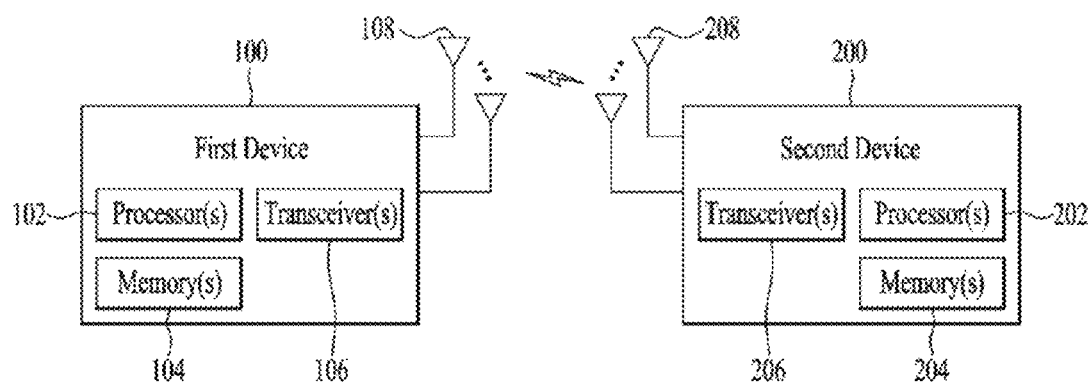
FIG. 21 illustrates wireless devices applicable to the present disclosure.

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100, the second wireless device 200} may correspond to {the wireless device 100x, the base station 200} and/or {the wireless device 100x, the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE or the vehicle may include the processor 102 and the memory 104 that are connected to the RF transceiver. The memory 104 may contain at least one program for performing an operation related to the embodiments described with reference to FIGS. 12 to 19.

The processor 102 may receive a request PRS from the positioning UE, may determine an orientation angle based on the positioning UE, based on the request PRS, may determine a response PRS identifier (ID) related to a request PRS ID of the request RRS based on the determined orientation angle, and may transmit a response PRS related to the determined response PRS ID. The processor 102 may perform an operation of determining an absolute position of the UE according to embodiments for performing positioning using the sidelink described with reference to FIGS. 12 to 19 based on a program included in the memory 104.

A chip set including the processor 102 and the memory 104 may be configured. In this case, the chip set may include at least one processor and at least one memory operatively connected to the at least one processor and causing the at least one processor to perform an operation when being executed, and the operation may include receiving a request PRS from the positioning UE, determining an orientation angle based on the positioning UE, based on the request PRS, determining a response PRS ID related to a request PRS ID of the request PRS based on the determined orientation angle, and transmitting a response PRS related to the determined response PRS ID. The processor 102 may perform an operation of determining an absolute position of the UE according to embodiments for performing positioning using the sidelink described with reference to FIGS. 12 to 19 based on a program included in the memory 104.

A computer readable storage medium containing at least one computer program for causing the at least one processor to perform operations may be provided. The operations may include receiving a request PRS from the positioning UE, determining an orientation angle based on the positioning UE, based on the request PRS, determining a response PRS ID related to a request PRS ID of the request RRS based on the determined orientation angle, and transmitting a response PRS related to the determined response PRS ID. The processor 102 may perform an operation of determining an absolute position of the UE according to embodiments for performing positioning using the sidelink described with reference to FIGS. 12 to 19 based on a program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may receive a request PRS from the positioning UE, may determine an orientation angle based on the positioning UE, based on the request PRS, may determine a response PRS identifier (ID) related to a request PRS ID of the request RRS based on the determined orientation angle, and may transmit a response PRS related to the determined response PRS ID. The processor 202 may perform the operation for determining an absolute position of the UE according to embodiments for performing the positioning using sidelink described with reference to FIGS. 12 to 19 based on the program contained in the memory 204.

A chip set including the processor 202 and the memory 204 may be configured. In this case, the chip set may include at least one processor and at least one memory operatively connected to the at least one processor and causing the at least one processor to perform an operation when being executed, and the operation may include receiving a request PRS from the positioning UE, determining an orientation angle based on the positioning UE, based on the request PRS, determining a response PRS ID related to a request PRS ID of the request PRS based on the determined orientation angle, and transmitting a response PRS related to the determined response PRS ID. The processor 202 may perform the operation for determining the absolute position of the UE according to embodiments for performing the positioning using sidelink described with reference to FIGS. 12 to 19 based on the program contained in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Application of Wireless Device Applicable to the Present Disclosure

Figure 22:
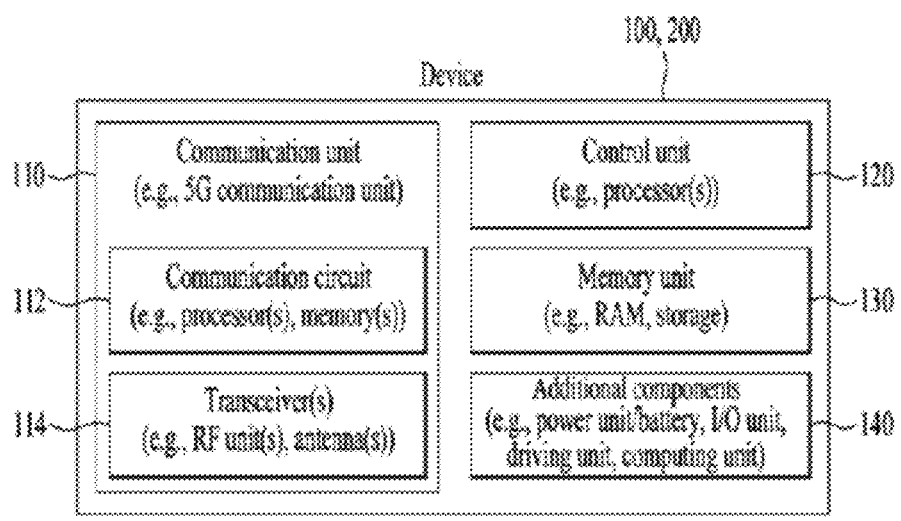
FIG. 22 illustrates another example of a wireless device applicable to the present disclosure.

FIG. 22 illustrates another example of a wireless device applied to the present disclosure. The wireless device may be implemented in various forms according to a use-case/service (refer to FIG. 25).

Referring to FIG. 22 wireless devices 100 and 200 may correspond to the wireless devices 100 and 200 of FIG. 221 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a FinTech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 23:
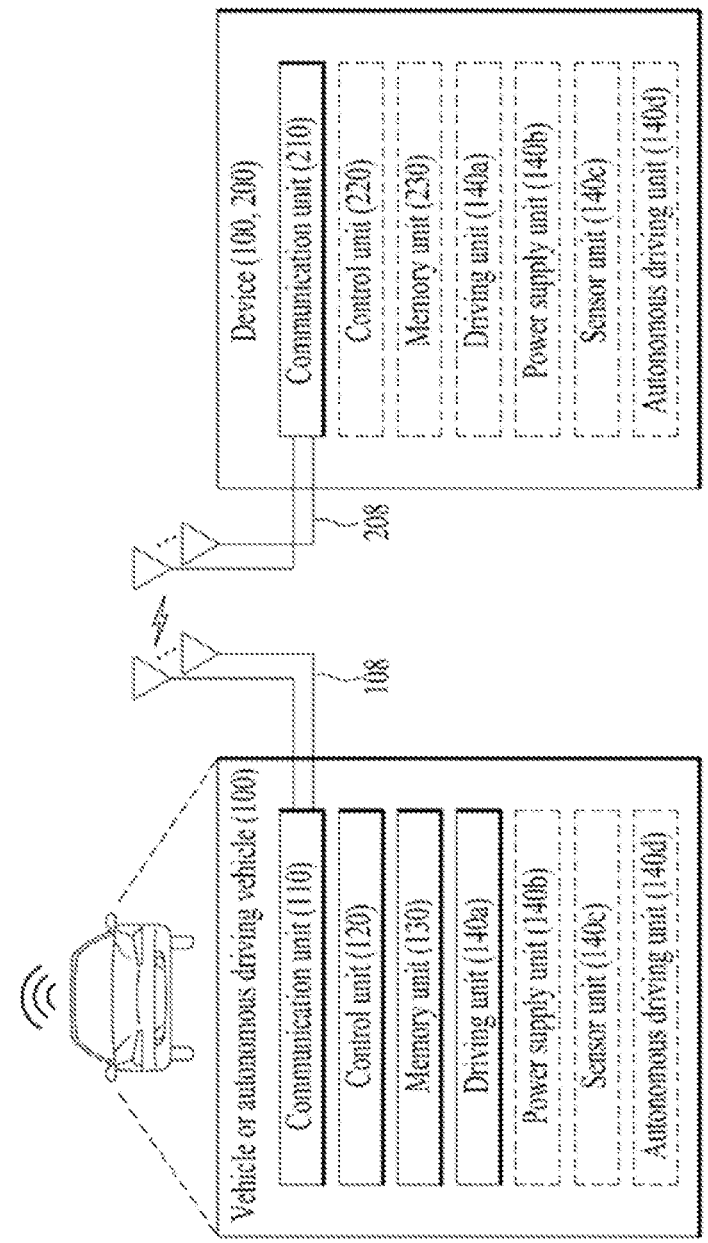
FIG. 23 illustrates a vehicle or an autonomous driving vehicle applied to the present disclosure.

Example of a Vehicle or an Autonomous Driving Vehicle to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL(non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various standards such as IEEE 802.15.4 and may be called various terms.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS), or a mobile subscriber station (MSS) as necessary.

The embodiments of the present disclosure may be implemented by various means, for example, hardware, firmware, software, or a combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Industrial Availability

The above-described embodiments of the present disclosure are applicable to various mobile communication systems.

What is claimed is:

1. A method performed by a first user equipment (UE), the method comprising:
   receiving a first reference signal (RS) related to positioning from a second UE;
   determining an orientation angle based on the second UE, based on the first RS;
   determining a second ID, wherein the second ID is an ID of a second RS pre-mapped to a first ID of the first RS based on the determined orientation angle; and
   transmitting the second RS to the second UE.

2. The method of claim 1, wherein the orientation angle is determined based on an angle of arrival (AoA) that is an incident angle measured for the first RS based on local coordinates or global coordinates.

3. The method of claim 2, further comprising:
when the local coordinates are used,
receiving information on a heading angle of the second UE from the second UE;
determining an AoA offset based on a heading angle of the first UE and the heading angle of the second UE; and
correcting the determined orientation angle based on the AoA offset.

4. The method of claim 1, wherein the second ID is selected from an ID group according to a predetermined orientation angle RS muting rule.

5. The method of claim 4, wherein the orientation angle RS muting rule defines an orientation angle range allocated for each ID of the ID group.

6. The positioning method of claim 5, wherein the orientation angle RS muting rule defines different orientation angle ranges for respective ID groups.

7. A first user equipment (UE) comprising:
a radio frequency (RF) transceiver; and
a processor connected to the RF transceiver,
wherein the processor is configured to:
receive a first reference signal (RS) related to positioning from a second UE;
determine an orientation angle based on the second UE, based on the first RS;
determine a second ID, wherein the second ID is an ID of a second RS pre-mapped to a first ID of the first RS based on the determined orientation angle; and
transmit the second RS to the second UE.

8. The UE of claim 7, wherein the processor is further configured to determine the orientation angle based on an angle of arrival (AoA) that is an incident angle measured for the first RS based on local coordinates or global coordinates.

9. The UE of claim 8, wherein, when the local coordinates are used by the processor, the processor is further configured to:
receive information on a heading angle of the second UE from the second UE;
determine an AoA offset based on a heading angle of the first UE and the heading angle of the second UE; and
correct the determined orientation angle based on the AoA offset.

10. The UE of claim 7, wherein the second ID is selected from an ID group according to a predetermined orientation angle RS muting rule.

11. The UE of claim 10, wherein the orientation angle RS muting rule defines an orientation angle range allocated for each ID of the ID group.

12. The UE of claim 11, wherein the orientation angle RS muting rule defines different orientation angle ranges for respective ID groups.

13. The UE of claim 7, wherein the UE is capable of communicating with at least one of another UE, UE related to autonomous driving vehicle, a base station, or a network.

14. A processor for performing positioning through sidelink, wherein the processor is configured to perform operations for a vehicle terminal,
wherein the operations include:
receiving a first reference signal (RS) related to positioning from a second UE;
determining an orientation angle based on the second UE, based on the first RS;
determining a second ID, wherein the second ID is an ID of a second RS pre-mapped to a first ID of the first RS based on the determined orientation angle; and
transmitting the second RS to the second UE.

* * * * *